(12) United States Patent
Kruszewski

(10) Patent No.: US 6,365,532 B1
(45) Date of Patent: Apr. 2, 2002

(54) CARDABLE BLENDS OF DUAL GLASS FIBERS

(75) Inventor: Reginald Thomas Kruszewski, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/482,403

(22) Filed: Jan. 12, 2000

Related U.S. Application Data

(62) Division of application No. 09/414,204, filed on Oct. 7, 1999, now Pat. No. 6,151,763, which is a division of application No. 09/030,682, filed on Feb. 25, 1998, now Pat. No. 6,010,785.

(51) Int. Cl.[7] .............................. B32B 5/26; D04H 1/08
(52) U.S. Cl. ............................ 442/35; 442/20; 442/26; 442/38; 442/40; 442/49; 442/320; 442/352; 442/353; 442/355; 428/357; 428/362
(58) Field of Search ................................ 428/357, 362; 442/20, 21, 26, 35, 38, 40, 49, 320, 324, 352, 353, 355

(56) References Cited

U.S. PATENT DOCUMENTS

| | | | |
|---|---|---|---|
| 2,998,620 A | 9/1961 | Stalego | 18/2.6 |
| 3,073,005 A | 1/1963 | Tiede | 28/82 |
| 3,953,566 A | 4/1976 | Gore | 264/288 |
| 4,110,392 A | 8/1978 | Yamazaki | 264/127 |
| 4,187,390 A | 2/1980 | Gore | 174/102 R |
| 4,361,619 A | 11/1982 | Forsten et al. | 428/234 |
| 4,522,876 A * | 6/1985 | Hiers | 442/388 |
| 4,612,237 A | 9/1986 | Frankenburg | 428/219 |
| 4,983,434 A | 1/1991 | Sassa | 428/36.2 |
| 5,536,550 A * | 7/1996 | Houpt et al. | 428/74 |
| 5,629,089 A * | 5/1997 | Berdan, II et al. | 428/392 |
| 5,723,216 A * | 3/1998 | Houpt et al. | 428/374 |

FOREIGN PATENT DOCUMENTS

| | | | |
|---|---|---|---|
| GB | 1030570 | 5/1966 | |
| WO | WO 95/12554 | 5/1995 | C03C/13/00 |
| WO | WO 95/29880 | 11/1995 | C03B/37/04 |

OTHER PUBLICATIONS

Technology Focus, Mechanical Engineering, Feb. 1995, vol. 117, No. 2, p. 38.

* cited by examiner

Primary Examiner—Cheryl A. Juska
Assistant Examiner—Ula C. Ruddock

(57) ABSTRACT

Dual glass fibers can be processed into coherent webs and felts by first blending the dual glass fibers with an equal or greater amount of uncrimped fibers. Optionally, other crimped fibers can be added without significant impact on processibility.

4 Claims, No Drawings

CARDABLE BLENDS OF DUAL GLASS FIBERS

This is a division of Application Ser. No. 09/414,204 filed Oct. 7, 1999 now U.S. Pat. No. 6,151,763, which is a Division of Application Ser. No. 09/030,682 filed Feb. 25, 1998, now granted and bearing U.S. Pat. No. 6,010,785.

The present invention relates to an intimate blend of fibers wherein one of the fibers is a dual glass fiber and the other is an uncrimped fiber. This combination of the two types of fibers allows practical textile processing of the dual glass fiber.

BACKGROUND OF THE INVENTION

Synthetic fiber felts are useful as filters and are well-known in the art. U.S. Pat. No. 4,361,619 to Forsten, et al. discloses a filter of poly(tetrafluoroethylene) and glass fibers made by blending 1–35 weight percent glass fibers and 65–99 weight percent poly(tetrafluoroethylene) fibers to make a carded web which was crosslapped to form a batt and then needled to form a felt. This crosslapped batt could also be needled to a supporting scrim of woven poly (tetrafluoroethylene) to form a felt or felted scrim.

U.S. Pat. No. 4,361,619 further disclosed in Example 2 the carding of blends containing straight glass fiber and crimped PTFE fiber. The patent states that even with the addition of a crimped fiber blends of more than 50 weight percent glass fiber were extremely difficult to card. Experience of those skilled in this art has shown that the term "extremely difficult" in this context means that the blend may not process through the card, that the quality of the carded web may not be sufficient to make a useful product, or that the speed of the card must be significantly reduced in order that any arrangement of fibers resembling a web be produced. The maximum speed of the card that can be achieved when the concentration of glass fibers is greater than 50 by weight of the blend is in the range of 1 meter/minute. The overall result has been that carding blends that contain more than 50% by weight glass fiber has not been practical.

The difficulty in making felts containing more than 50% by weight glass fiber has been attributed to the lack of crimp in glass fiber. Accordingly, those skilled in the art related to making glass fibers have suggested that curly glass fibers would be more processible in forming felts than straight fibers. This has not proven to be the case.

Curly or irregularly shaped fibers were made by spinning a combination of two glasses into a fiber. U.S. Pat. No. 2,998,620 to Stalego discloses curly glass fibers of dual glass compositions. Stagelo teaches producing curly fibers by passing two glass compositions, each having different coefficients of thermal expansion, through the orifices of a spinner. The glasses are extruded in aligned integral relationship such that these fibers curl naturally upon cooling.

U.S. Pat. No. 3,073,005 to Tiede discloses an improved, faster process for making bicomponent (dual) curly glass fiber compositions of Stalego Both Stalego and Tiede disclose an improvement in the carding of these bicomponent glass fibers when crimped soluble fibers are blended with the glass fibers.

Additional work has been performed by others, and most recently International Patent Applications WO95/12554, which discloses glass compositions which make useful dual glass fibers, and WO95/29880, which discloses dual glass fibers having special bonding properties have been published.

The primary producer of curly glass fibers, Owenings-Corning Fiberglas Corporation of Toledo, Ohio, has disclosed in published articles (such as Mechanical Engineering, volume 117, number 2, page 38, February 1995) that their dual glass fiber, sold under the trademark MIRAFLEX, has high resilience and is recommended for use in insulation. In addition it has been stated that this dual glass fiber can be carded and needled in traditional textile processes. However, attempts, by the present inventor and others, to actually card such dual glass fibers as MIPAFLEX at commercially accepted carding speeds have not heretofore been successful. The high resilience of the curly glass fiber acts to preclude normal carding. Art applicable to low modulus fibers such as British Patent No.1,030,570, which teaches an improved carding process for nylon, is not applicable to the very high modulus, fragile glass fiber.

SUMMARY OF THE INVENTION

The present invention provides an intimate cardable blend of fibers comprising a dual glass fiber and an uncrimped fiber wherein the uncrimped fiber are present in an amount equal to or greater than the amount of the dual glass fiber. The blend may further comprise a third fiber, which is a crimped fiber.

The fiber blends of the present invention are easily carded at commercially acceptable carding speeds to form uniform, coherent webs from which batts and felts may be formed.

The preferred fiber blend of the present invention comprises an intimate blend of from about 1–30 weight percent dual glass fiber, from about 1–60 weight percent uncrimped fiber, and from about 10–98 weight percent of a crimped fiber, wherein the uncrimped fiber is present in an amount equal to or greater than the amount of the dual glass fibers.

A preferred uncrimped fiber is "DE" type glass, and the preferred crimped fiber is a fluoropolymer fiber. Of particular value for the crimped fiber is PTFE fiber. Most preferred are blends containing about 20 weight percent dual glass fiber, 30 to 50 weight percent "DE" type uncrimped glass fiber and 50 to 30 weight percent crimped fluoropolymer fibers.

The present invention also provides filter felts comprised of a layered batt formed from these fiber blends and a scrim wherein the layered batt of fibers is comprised of an intimate blend of from about 1–30 weight percent dual glass fiber, from about 1–60 weight percent uncrimped fiber, and from about 10–98 weight percent of a crimped fiber, wherein the uncrimped fiber is present in an amount equal to or greater than the dual glass fibers. Filter felts (felts or felted scrims) of the present invention may be laminated to a membrane or other suitable substrate.

The present invention also provides a method by which batts and felts can be made.

DETAILED DESCRIPTION OF THE INVENTION

This invention relates to an intimate cardable blend of fibers wherein one of the fibers is a dual glass fiber and the other is an uncrimped fiber. This combination of the two types of fibers allows practical textile processing of the dual glass fiber.

The term dual glass fiber as used herein means a glass fiber made from two or more glass compositions having different coefficients of expansion. Dual glass fibers may also be known as irregularly-shaped glass fibers or bi-glass fibers. These glass fibers are not straight, but instead curl after spinning producing a natural, random twist. Ideally, a cross sectional view of the fiber would show one half of the fiber to be formed of a first glass composition, and the other half of the fiber to be formed of a second glass composition.

A preferred form of dual glass fiber is sold by Owens-Corning Fiberglas, Inc. under the trademark MIRAFLEX. MIRAFLEX has been reported to be produced from two different forms of sodium borosilicate glass fused together into a single filament. Unlike conventional straight glass fibers, MIRAFLEX fibers have random twist, and are advertised as being soft, flexible, silky to the touch, and virtually itch-free. The high resilience of the fiber makes it especially suitable for use in rolled insulation, where the fiber, and thus the insulation, may be tightly rolled to form a compact package which recovers much of the initial bulk and loft when unrolled.

The uncrimped fiber of the present invention is an essentially straight fiber without significant bends, twist, curl or irregularities of shape. The preferred uncrimped fiber is "DE" type glass fiber or other straight suitable glass fibers. While it is not fully understood, the addition of the uncrimped fiber appears to reduce the resiliency of the dual glass fibers, thereby reducing the loft or fluffiness of the blend and allowing practical textile operating speeds. Other uncrimped fibers which may be useful in this invention are uncrimped aramid fibers, such as paraaramids, uncrimped fluoropolymer fibers, such as PTFE and PFA fibers, uncrimped polyethylene or polypropylene fibers, uncrimped polyamide fibers, uncrimped polyester, polyimide or polyphenylene sulfide fibers.

The term fluoropolymer as used herein means poly (tetrafluoroethylene) (PTFE) and polymers generally known as fluorinated olefinic polymers, for example, co-polymers of tetrafluoroethylene and hexafluoropropene (FEP), co-polymers of tetrafluoroethylene and perfluoroalkyl-vinyl ethers such as perfluoropropyl-vinyl ether (PFA) and perfluoroethyl-vinyl ether, fluorinated olefinic terpolymers including those of the above-listed monomers and other tetrafluoroethylene based co-polymers.

The term commercially accepted carding speeds means card speeds of at least 4 meters per minute.

A critical parameter for the success of this intimate blend is that the uncrimped fiber must be present in an amount equal to or greater than the dual glass fibers. If too little uncrimped fiber is added, the resiliency of the dual glass fibers will be too high and the blend will not process at practical speeds.

A third fiber, one which is crimped, may be added to the blend of dual glass and uncrimped fibers to add functionality or act as a binder material for subsequent felts made from the blend. It is preferred that this third fiber be a crimped fluoropolymer fiber selected from the class of PTFE, PFA, and the like, sold under the E. I. DuPont trademark of TEFLON Fiber. Other crimped fibers that may be used in the present invention include crimped aramid fibers, such as para-aramids, crimped polyethylene or polypropylene fibers, crimped polyamide fibers, crimped polyester, polyimide or polyphenylene sulfide fibers.

The fiber blends of the present invention card easily to form uniform, cohesive webs from which batts and felts can be formed. A felt according to the present invention can be a needled batt or a batt needle punched into a scrim. The preferred composition of the scrim contains PTFE fiber, either filament or staple, expanded or not expanded. The scrim may also contain glass fiber. The preferred scrim is a woven scrim although scrims may be woven or nonwoven.

Felts made according to the present invention can be combined into layered fabrics for use in filtration. Additional components that may be used with the felts or felted scrims of the present invention to form filter fabrics include those materials used in the art of filtration such as expanded PTFE membranes, PTFE membranes or other substrates laminated or otherwise attached to the felt; PTFE fabrics or webs or blends of various fiber such as PTFE and other fluoropolymers, glass, carbon or polyimide formed into fabrics or webs; and other materials suitable for the temperatures and chemical environment of the desired use.

The fiber blends of the present invention are blended and processed using typical textile equipment for making felts. In a typical process, a quantity of the dual glass fiber and the uncrimped fiber (and optionally the third fiber component) are combined and blended on a garnett. The resulting blend is then processed through a card to form a uniform, cohesive web which is crosslapped to make a batt of fibers. The crosslapped batt can be made directly into a felt by needle punching or can be laid onto a scrim and then needle punched into the scrim.

Although dual glass fibers have been said to be more processible, this is not the experience of the inventors of the present invention. When the dual glass fibers were used neat in the card, the loft or fluffiness of the fibers caused the fiber to build up into a mass of fibers at the entrance of the card, forming a plug. Also, the fluffiness of the fibers prevented the teeth of the card from extracting a quantity of fiber from the mass of fibers which was large enough to make a coherent web. The addition of at least an equal amount of uncrimped fiber reduced the fluffiness of the fibers and prevented the plug from forming. It allowed the teeth of the card to extract a large quantity of fiber and to make a coherent web. Thus, the term cardable as used herein defines a fiber blend that can be carded, forming a coherent web, at a rate greater than 4 meters per minute. The addition of a third component crimped fibers to this blend did not significantly impact the processing.

It is well-known that uncrimped fibers do not typically card or process well in textile equipment, so it is surprising that the processing of bent or curved fibers could be improved by the addition of an uncrimped fiber.

The fibers used in the present invention, either crimped or uncrimped or the dual glass fiber may be of a variety of fiber cut lengths. Generally the cut length of fibers used in the present invention range from about 1 to 4 inches, preferably from about 1 to 3 inches. For the crimped fiber component of the three fiber blend of the present invention, the number of crimps per inch should be at least 7.

These blends are useful in the production of filter felts, and the inventors have found that a particularly useful blend is an intimate blend of about 1–30 weight percent dual glass fibers, about 1–60 weight percent uncrimped fiber, and about 10–98 weight percent of a crimped fiber made from a fluoropolymer, wherein the uncrimped fiber is present in an amount equal to or greater than the dual glass fiber. An especially preferred uncrimped fiber is "DE" type glass fiber, and an especially preferred fluoropolymer fiber is poly(tetrafluoro-ethylene) fiber (PTFE). This blend is favored because it allows the production of a fluoropolymer filter felt containing up to 70 weight percent glass.

Within these weight ranges it has been found that felts containing about 20 to 25 weight percent dual glass fiber, about 30 to 50 weight percent "DE" type glass fiber, and 25 to 50 weight percent PTFE crimped fiber are especially useful. Two particular composition within this preferred range are illustrated in the Examples below.

For these three component blends, it has been found that the practical upper limit for the dual glass fiber is slightly more than about 30 weight percent. Above about 25 weight percent the fiber mixture begins to becomes fluffy, and it becomes more difficult to card blends of about 30 weight percent dual glass fiber into a uniform, cohesive web. A total of about 70 weight percent glass is also thought to be a practical upper limit when using or making a three component blend. Since at above about 70 weight percent glass fiber (dual plus "DE" type or other type straight glass fiber) a cohesive web is not practicable.

As before, the mixture of the three fibers is processed using typical textile equipment for making felts. In a typical process, a quantity of the dual glass fiber, the uncrimped "DE" type glass fiber and the PTFE fiber are combined and blended on a garnett. The resulting blend is then processed through a card to form a web which is crosslapped to make a batt of fibers. The crosslapped batt can then be made directly into a felt by needle punching or preferably can be laid onto a woven or nonwoven scrim and then needle punched into the scrim to form a felted scrim. The scrim typically contains PTFE fiber or a mixture of PTFE and glass fiber The felt or the felted scrim may then be heat set as is known in the art using typical equipment and processing conditions. A tenter frame may be used to reduce excessive shrinkage in the oven. The high-glass-content filtration felts or felted scrims of the present invention have equivalent or better filtration efficiencies when compared to the felts or felted scrims of the prior art having a high content of PTFE fiber.

A felt or felted scrim such as described above may be laminated to a fluoropolymer, usually PTFE, membrane. Membranes known in the art, including porous and expanded PTFE membranes, are suitable to be laminated to the felt of the present invention. Lamination usually accomplished by bonding the felt or felted scrim to the membrane with a fluorinated polymer adhesive such as fluorinated ethylene propylene (FEP) copolymer, tetrafluoroethylene perfluoropropylene copolymer, polyvinylidene difluoride and the like. The adhesive may be applied as a dispersion by various means known in the art such as coating or spraying to one side of the felt. The felt or felted scrim is then usually dried before the membrane is attached. The membrane is then placed over the adhesive and the adhesive cured while under a light applied pressure. The resulting assembly is useful in filter bag applications. Descriptions of the process used to produce expanded PTFE and PTFE laminated filter materials may be found in the following U.S. Pat. Nos. 4,983,434; 4,110,392;3,953,566 and 4,187,930.

In the above description and the Examples below, "DE" type glass is made reference to, but other types of glass are useful in the present invention. The term "DE" as applied to glass defines a diameter range as specified in ASTM D 578. Thus "DE" type glass has a diameter range of 5.84 to 6.85 microns. It may also have a variety of finishes and be available from a variety of suppliers. In the formation of filter felts, typically glass fibers of the smallest diameter are preferred since these small diameter fibers produce more effective filters. Generally the lower limit on the diameter range of glass that is employed in the production of such a filter felt is limited to diameter sizes that are not known to be health hazards. In practice then glass fibers such as "DE" or "HI" are of value in the production of filter felts according to the present invention. But for other uses for which one might care to use the fiber blends of the present invention, glass fibers may be selected in any size range and having any surface treatment desired that will be serviceable and safe for the intended use.

The following Examples are intended to illustrate the present invention, but are not intended to limit the present invention.

EXAMPLES

Example 1

TEFLON brand PTFE fibers having 3.2 dpf and a 3" cut length were blended with MIRAFLEX brand dual glass fibers using garnett and air conveying equipment. This same equipment and processing was used to blend "DE" type glass staple fibers and PTFE as a control. This control fiber blend consisted of 75% by weight PTFE fibers having 3.2 dpf, and a 3" cut length and 25% by weight "DE" type glass fibers chopped to 2" cut length.

Several experimental blends of dual glass fibers, crimped PTFE fibers and "DE" type glass fibers were made and processed into a web by carding the fiber mixtures. The fiber blends were as follows. The Percentages are weight percents of the total blend.

1. 33%/20%/47% PTFE fibers/dual glass fibers/"DE" type glass fibers
2. 40%/30%/30% PTFE fibers/dual glass fibers/"DE" type glass fibers
3. 40%/20%/40% PTFE fibers/dual glass fibers/"DE" type glass fibers
4. 50%/20%/30% PTFE fibers/dual glass fibers/"DE" type glass fibers The control was the 75% PTFE fiber/25% "DE" type glass fiber blend.

The control was run on the card to make sure the carding system was functioning properly. Blend #1 ran and carded well with no adjustments to the card required. This three component blend had minimal "fallout" under the card and broken glass filaments appeared to be even lower than the control. Several yards of felt were produced for testing.

Blend #2 also processed acceptably, but marginally so. It was evident from observation of the processing that higher dual-glass content blends would not process acceptably.

Blends #3, #4 ran well and were very similar in behavior to blend #1. Several yards of felt were produced for testing from blend #4.

The two pieces of felt produced from sample #1 and #4 were tested for felt and filtration properties. Both provided excellent filtration and both had improved abrasion resistance.

TABLE

| Samples fiber blend | | Samples | | |
|---|---|---|---|---|
| | | Control | 4 | 1 |
| Weight % | | 75/25 | 5/20/30 | 33/20/47 |
| FELT PROPERTIES: | | | | |
| | | Non Heat Set Samples | | |
| | | Control | 4 | 1 |
| Basic Weight | felt (g/m2) | 475 | 547 | 486 |
| | faces (g/m2) | 345 | 417 | 356 |
| | scrim (g/m/2) | 130 | 130 | 130 |
| | | Heat Set Samples | | |
| | | Control | 4 | 1 |
| | felt (g/m/2) | 518 | 549 | 480 |
| | faces (g/m/2) | 388 | 419 | 350 |
| Thickness | mm | 1.36 | 1.66 | 2.32 |
| Density | g/cm3 | 0.35 | 0.33 | 0.21 |

TABLE-continued

ABRASION TEST: 500 cycles at 5N pressure

| | | Heat Set at 240 C. for 2 min. | | |
|---|---|---|---|---|
| | | Control | 4 | 1 |
| % weight loss | | 24.5 | 13.9 | 8.8 |
| % thickness loss | | 100 | 50.9 | 46.2 |
| scrim visible (cycles) | | 200 | 300 | 500 |

| | | Heat Set at 300/290 C. for 2 min. First Series | | |
|---|---|---|---|---|
| | | Control | 4 | 1 |
| % weight loss | | 15.6 | 14.2 | 4.2 |
| % thickness loss | | 52.9 | 46.7 | 26.2 |
| pressure scrim visible (cycles) | | 200 | 300 | no |

| | | Heat Set at 300/290 C. for 2 min. Second Series | | |
|---|---|---|---|---|
| | | Control | 4 | 1 |
| % weight loss | | 15.7 | 12.3 | 6.4 |
| % thickness loss | | 38.5 | 37.6 | 28.4 |
| pressure scrim visible (cycles) | | 200 | 200 | 500 |

FREE SHRINKAGE: 1 hour at 300° C.

| | | Not Heat Set Samples | | |
|---|---|---|---|---|
| | | Control | 4 | 1 |
| M-D/X-D (%) | | 5/13.5 | 2/9 | 1/4 |

| | | Heat Set 240 C. for 2 min | | |
|---|---|---|---|---|
| | | Control | 4 | 1 |
| M-D/X-D (%) | | 4/9.5 | 1/6 | 1/2 |

| | | Heat Set 300/290 C. for 2 min | | |
|---|---|---|---|---|
| | | Control | 4 | 1 |
| M-D/X-D (%) | | 1/2 | 0.5/2 | 0.5/1 |

FILTER FABRIC PROPERTIES:

| | | Control | 4 | 1 |
|---|---|---|---|---|
| Weight | g/m2 | 546 | 549 | 486 |
| Thickness | mm | 1.25 | 1.45 | 2.00 |
| Density | g/cm2 | 0.437 | 0.379 | 0.243 |
| Pore Diameter (avg) | microns | 20.9 | 20.7 | 25.8 |
| Air Permeability | 1/dm$^2$/min | 210 | 188 | 312 |

FILTRATION PERFORMANCE:

| | | Cycles | Control | 4 | 1 |
|---|---|---|---|---|---|
| Dust, | 25° C. | 20 | 1.14 | 1.56 | 5.6 |
| Leakage | 25° C. | 60 | 2.14 | 2.29 | 11.4 |
| (mg/m3) | | 100 | 3.22 | 3.00 | 28.1 |
| | 250° C. | 100 + 20 | 5.03 | 4.42 | 132 |
| Dust | 25° C. | 20 | 199 | 152 | 440 |
| Retention | 25° C. | 60 | 229 | 192 | 521 |
| (on/in filter media) | 25° C. | 100 | 238 | 205 | 561 |
| (g/m2) | 250° C. | 100 + 20 | 257 | 273 | 578 |
| Test | 25° C. | 20 | 4.93 | 5.7 | 5.13 |
| Duration | 25° C. | 60 | 8.89 | 11.2 | 8.83 |
| (hours) | 25° C. | 100 | 11.4 | 14.4 | 11.5 |
| | 250° C. | 100 + 20 | 19 | 24.9 | 16.3 |

In the Table above the following tests methods were used to measure filter material performance: dust leakage was measured according to (Verein Deutscher Ingenieure). Method No. 3926; abrasion was measured according to DIN Method 53528 using 500 cycles at 15 N pressure; and air permeability was measured according to DIN Method 53887 which corresponds to ISO Method 9237.

Comparative Example

TEFLON brand PTFE fibers having 3.2 dpf and a 3" cut length were blended with MIRAFLEX brand dual glass fibers using garnett and air conveying equipment. This same equipment and processing was used to blend "DE" type glass staple fibers and PTFE as a control. This control fiber blend consisted of 75% by weight PTFE fibers having 3.2 dpf, and a 3" cut length and 25% by weight "DE" type glass fibers chopped to 2" cut length. Three different experimental blend weight ratios were produced:

5. 75%/25% PTFE fibers/dual glass fibers
6. 40%/60% PTFE fibers/dual glass fibers
7. 25%/75% PTFE fibers/dual glass fibers The control was the 75% PTFE fiber/25% "DE" type glass fiber blend.

Attempts were made to card and produce felts from all four experimental blend samples. The control was successfully carded into a web. This test assured that the equipment setup was working properly.

None of these experimental blends could be successfully carded under practical conditions. Blend 5 required a very low card speed (less than 1 m per minute) to form a web. Blend 6 was very bulky and showed excessive "fallout" of the dual glass fibers even with hand applied assistance in feeding the fibers into the card along with using card speeds of less than 1 m per minute. The dual glass fiber appeared to break during carding, falling off the card and piling up under the equipment. Blend 7 did not feed into the card.

An attempt was made to modify the carding system to allow for the bulkiness of blend 6. Although the feed system and roll speeds were modified, feeding fiber to the card was still difficult and "fallout" of the dual glass fiber was so high that the web that was produced was only 30%—half of the initial weight percent of the glass fiber in the fiber blend feed. This only sight improvement in the dual glass content of the glass/PTFE fiber web over the control, which formed a web and felt having 25% "DE" type glass fibers, was deemed to be impractical.

What is claimed is:

1. A filter felt comprising a layered batt of fibers and a scrim, the layered batt of fibers comprising an intimate blend of from about 1–30 weight percent dual glass fibers, from about 1–60 weight percent uncrimped fiber and from about 10–98 weight percent of a crimped fiber, wherein the uncrimped fiber is present in an amount equal to or greater than the dual glass fibers.

2. The filter felt of claim 1 wherein the uncrimped fiber is a glass fiber and the crimped fiber is selected from the group consisting of aramid fibers and fluoropolymer fibers.

3. The filter felt of claim 2 wherein the batt contains about 20 weight percent dual glass fiber, 30 to 50 percent of an uncrimped glass fiber having a diameter range of 5.84 to 6.85 microns and 50 to 30 weight percent crimped poly (tetrafluoroethylene) fibers.

4. The filter fabric of claim 1 or 3 on which is laminated a porous or expanded fluoropolymer membrane.

* * * * *